United States Patent [19]

Hogg

[11] Patent Number: 4,490,978
[45] Date of Patent: Jan. 1, 1985

[54] FLUID PRESSURE PROPORTIONERS

[75] Inventor: Hubert Hogg, Dayton, Ohio

[73] Assignee: General Motors Corporation, Detroit, Mich.

[21] Appl. No.: 406,111

[22] Filed: Aug. 6, 1982

[51] Int. Cl.³ .............................................. B60T 11/06
[52] U.S. Cl. ........................................ 60/561; 60/562; 60/591; 303/6 C
[58] Field of Search .......................... 60/561, 562, 591; 303/6 C

[56] References Cited

U.S. PATENT DOCUMENTS

| 3,277,650 | 10/1966 | Cripe | 303/6 C X |
|---|---|---|---|
| 3,588,190 | 6/1971 | Nakano et al. | 303/6 C |
| 4,053,186 | 10/1977 | Jakobi | 303/6 C |
| 4,331,363 | 5/1982 | Berisch | 303/6 C |
| 4,426,117 | 1/1984 | Burgdorf et al. | 303/6 C |

FOREIGN PATENT DOCUMENTS

| 1500296 | 5/1969 | Fed. Rep. of Germany | 303/6 C |
|---|---|---|---|
| 1135410 | 4/1959 | France | 303/6 C |
| 2051989 | 1/1981 | United Kingdom | 303/6 C |
| 2082705 | 3/1982 | United Kingdom | 303/6 C |
| 2090357 | 7/1982 | United Kingdom | 303/6 C |

Primary Examiner—Robert E. Garrett
Assistant Examiner—Timothy E. Nauman
Attorney, Agent, or Firm—D. D. McGraw

[57] ABSTRACT

Modular proportioners such as those of U.S. Pat. No. 4,213,655 are machined and separated into parts provided with appropriate O-ring seals so that the proportioners may be installed in an auxiliary bore of the master cylinder body. Threaded proportioner connections are eliminated. The proportioner parts are assembled by dropping them in place, in order, in the bore. They are retained in place by a retaining ring. This eliminates threaded connections and is adapted for automatic assembly.

1 Claim, 4 Drawing Figures

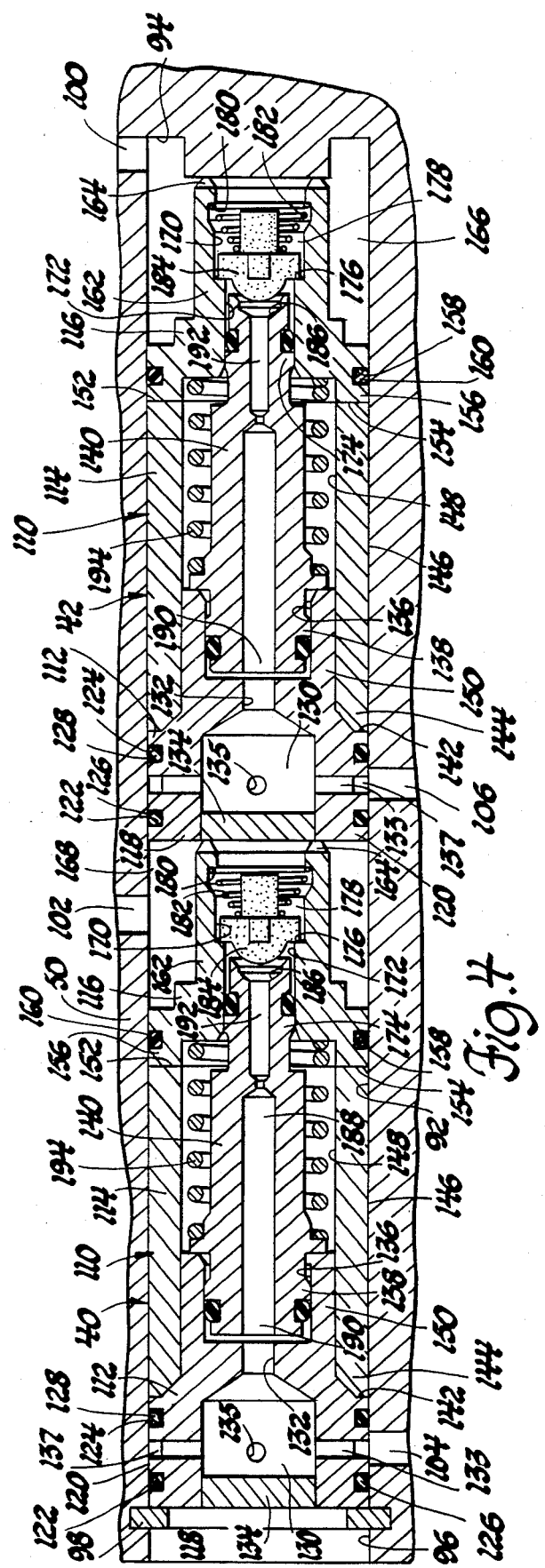
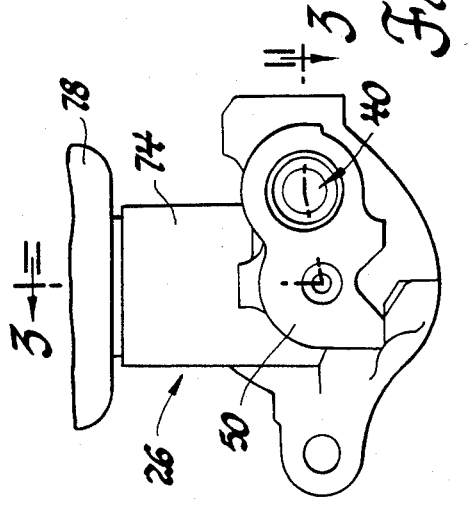

FLUID PRESSURE PROPORTIONERS

The invention relates to modular proportioner assemblies for dual master cylinders, and more particularly to such assemblies wherein the major components of the proportioner assemblies are assembled in a bore by insertion in order and having those components defining proportioner housing sections being in abutting relation. They are held in fixed relation to each other and to their inlet and outlet ports by a retainer installed after the components have been inserted and slid into place. No screw threads are required for any parts of the proportioner assemblies. The proportioner assemblies are particularly well adapted for automatic assembly.

In the drawings

FIG. 2 is an end view of the master cylinder assembly of FIG. 1.

FIG. 4 is an enlarged fragmentary cross-section view of a portion of the master cylinder assembly of FIGS. 2 and 3 and particularly illustrating the proportioner section thereof.

Figure 1:
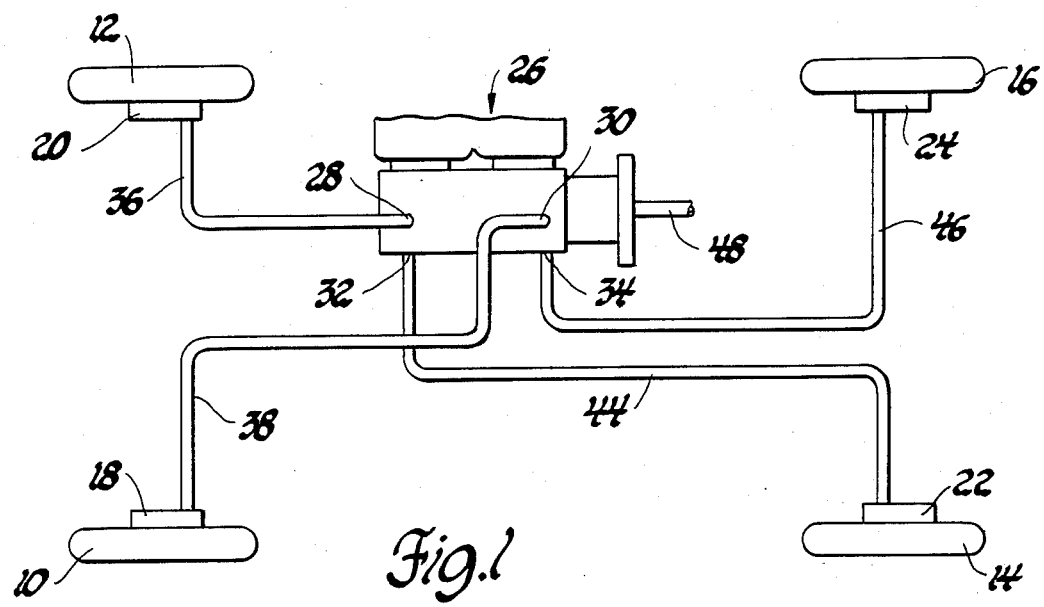
FIG. 1 is a schematic representation of a vehicle brake system embodying the invention.

The vehicle in which the brake system schematically illustrated in FIG. 1 is installed has front left and right wheels 10 and 12 and rear left and right wheels 14 and 16. These wheels are respectively provided with wheel brake units 18, 20, 22 and 24. The system includes the master cylinder assembly 26 and appropriate conduits connecting that assembly to the wheel brake units. The particular system illustrated is a diagonally split system. The master cylinder assembly 26 is illustrated as having outlets 28 and 30 leading from separate master cylinder pressurizing chambers, and additional outlets 32 and 34 similarly leading from the separate pressurizing chambers. Conduit 36 connects outlet 28 to the front right wheel brake unit 20. Conduit 38 connects outlet 30 with the front left wheel brake unit 18. The master cylinder assembly 26 has modular proportioner assemblies 40 and 42, shown in FIGS. 3 and 4, positioned in a bore of the master cylinder housing so that they may respectively proportion brake actuating pressures delivered through outlets 32 and 34 to the rear brake units 22 and 24. Conduit 44 connects outlet 32 with the rear left wheel brake unit 22 and conduit 46 connects outlet 34 with the rear right wheel brake unit 24. Thus the rear pressurizing chamber of the master cylinder assembly 26 is illustrated as providing pressurized brake fluid to the front left wheel brake unit 18 and the rear right wheel brake unit 24. Furthermore, the forward master cylinder pressurizing chamber similarly provides pressurized brake fluid to the front right wheel brake unit 20 and to the rear left wheel brake unit 22. The master cylinder input push rod 48 may be suitably actuated by the vehicle operator either manually or through an appropriate power brake booster unit.

Figure 3:
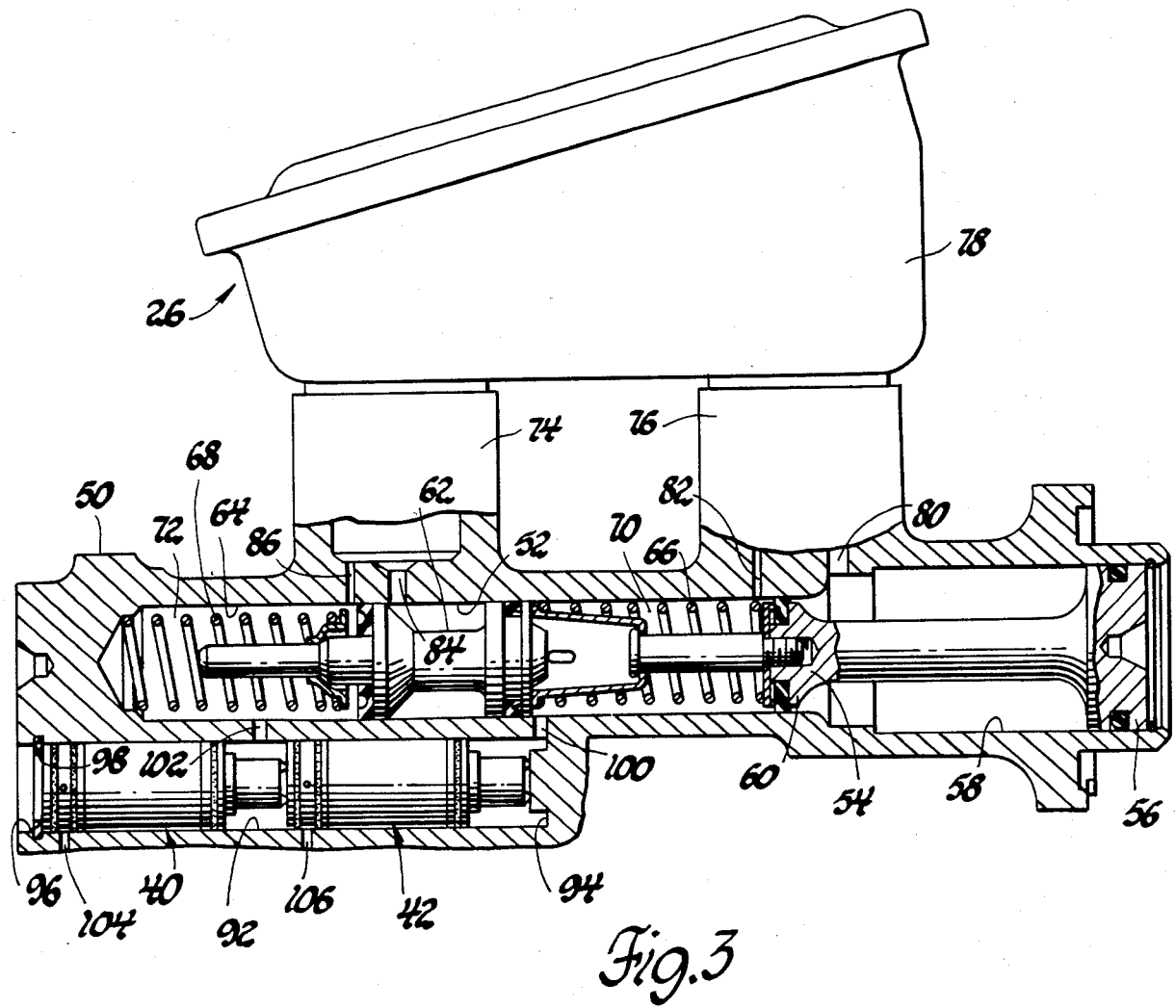
FIG. 3 is a cross-section view of the master cylinder assembly of FIG. 2, taken in the direction of arrow 3—3 of that Figure and having parts broken away.

The master cylinder assembly 26 is more particularly illustrated in FIGS. 2 through 4. It includes a master cylinder housing 50 in which is provided a master cylinder bore 52. A primary pressurizing piston 54 is reciprocably mounted in bore 52. The particular piston and master cylinder arrangement illustrated is of the quick take-up type such as that shown in U.S. Pat. No. 4,208,881, entitled, "Quick Take-Up Master Cylinder", issued June 24, 1980. It is to be understood that the invention may be used with other dual master cylinder assemblies. Examples of other such assemblies are found in U.S. Pat. No. 2,157,733—Sessions and U.S. Pat. No. 3,877,228—Shellhause. A master cylinder assembly having separate, threadedly attached, modular proportioners is the subject of U.S. Pat. No. 4,213,655, entitled, "Master Cylinder Assembly and Brake System Incorporating Same", and issued July 22, 1980. The internal construction of the proportioners of that patent is similar to the internal construction of the proportioners shown in the drawings. The proportioner housings have been substantially modified to achieve the desired results. The invention may also be used with master cylinder assemblies having more than two pressurizing chambers.

The primary pressurizing piston 54 has a rearward land 56 reciprocably movable in an enlarged section 58 of bore 52, and a smaller forward land 60 reciprocably movable in the smaller forward portion of bore 52. A secondary pressurizing piston 62 is reciprocably received in bore 52 intermediate piston 54 and the forward end 64 of bore 52. Suitable piston return springs 66 and 68 are provided for pistons 54 and 62. Spring 66 is located in the primary pressurizing chamber 70, which is positioned axially between the forward end of piston 54 and the rear end of piston 62. Spring 68 is located in the secondary pressurizing chamber 72, which is axially intermediate the forward end of piston 62 and the bore forward end 64. Suitable pressurizing chamber outlets, not shown in FIG. 2 but shown in FIGS. 3 and 4 and described in greater detail below, are provided.

The master cylinder housing 50 has reservoir mounting bosses 74 and 76 extending upwardly therefrom. A master cylinder reservoir 78 is illustrated as being mounted on bosses 74 and 76 in a manner much the same as that disclosed in the above noted U.S. Pat. No. 4,208,881. Rear compensation ports 80 and 82 provide fluid communication between reservoir 78 and certain portions of bore 52. The details of such communication may be comparable to those in the above noted U.S. Pat. No. 4,208,881, by way of example. Forward compensation ports 84 and 86 provide fluid communication through boss 74 with reservoir 78 and bore 52 as also described in greater detail in the above noted U.S. Pat. No. 4,208,881.

The end view of the master cylinder assembly 26 illustrated in FIG. 2 is at the forward end of the assembly. The portion of the housing 50 having bore 52 formed therein is immediately beneath boss 74. As shown in FIG. 3, the proportioners 40 and 42 are inserted in tandem within a bore 92 formed in a portion of housing 50 so as to be laterally offset from bore 52. It is preferred that bore 92 be axially parallel to bore 52 so that various machining operations may be accommodated. The elements of proportioners 40 and 42 are functionally like the modular proportioner of U.S. Pat. No. 4,213,655 insofar as their proportioning actions are concerned, but have been modified structurally in many respects to obtain the advantages set forth herein. The bore 92 has a closed bore end 94 and an open end 96. A retainer 98 in the open end 94 holds proportioners 40 and 42 in bore 92 and is removable to permit servicing of the proportioners. The outlet port 100 connects primary pressurizing chamber 70 with bore 92 adjacent bore end 94. Outlet port 102 connects secondary pressurizing chamber 72 with a portion of bore 92 between proportioners 40 and 42. Outlets 32 and 34 respectively connect with proportioner bore outlet ports 104 and 106, formed in housing 50 and opening at suitable parts of bore 92 so that pressurized fluid from port 100 must flow through proportioner 42 to reach port 106 and pressurized fluid from port 102 must flow through proportioner 40 to reach port 104.

The modular proportioner assemblies 40 and 42 are illustrated in greater detail in FIG. 4. Since each modular proportioner assembly is identical to the other, the same reference numerals are applied, and only one assembly is described below in detail. Each modular proportioner assembly has a housing 110 defined by three housing sections 112, 114 and 116. All three housing sections have a common maximum outer diameter of a size to permit a free sliding fit within bore 92. Housing section 112 has an end 118 which in the assembled unit abuts retainer 98. It has a land, defined by the maximum outer diameter portion 120, with axially spaced seal grooves 122 and 124 formed therein. O-ring seals 126 and 128 are respectively received in grooves 122 and 124 and seal against the cylindrical wall of bore 92. A chamber 130 is found by an enlarged portion of a bore 132 in housing section 112 and closed by plug 134 at housing section end 118. Cross passages 133 and 135 in housing section 112 intersect with and open into chamber 130. Their outer ends extend through portion 120, terminating in an annular groove 137 located axially between seal grooves 122 and 124. In the installed position, outlet 104 is always aligned with groove 137 of proportioner 40 and outlet 106 is always aligned with groove 137 of proportioner 42. Bore 132 has an enlarged inner end portion 136 in which one end 138 of the proportioning piston 140 is reciprocably and sealingly received. Housing section 112 has an abutment surface 142 on the inner side of portion 120. The outer end 144 of housing section 114 is in abutting relation with surface 142.

Housing section 114 is formed as a cylinder with the outer surface 146 being at the common maximum outer diameter. A bore 148 extends through section 114 and is of a diameter which permits the reduced diameter inner end 150 of housing section 112 to fit in free sliding relation thereto. The inner end 152 of housing section 114 forms an abutment surface in abutting relation with the outer end 154 of housing section 16.

Housing section 116 has a land 156, defined by the maximum outer diameter portion thereof, with a seal grooved 158 formed therein. O-ring seal 160 is received in groove 158 and seals against the cylindrical wall of bore 92. A reduced diameter portion 162 of housing section 116 extends inwardly of bore 92 toward bore end 94. Its end surface 164 is castellated and serves as an abutment surface. The end surface 164 of proportioner 42 abuts the end 94 of bore 92, that bore end being illustrated as a boss so as to properly position the proportioners in bore 92 relative to ports 102, 104 and 106 while still giving fluid access to bore 92 through port 100. The end surface 164 of proportioner 40 abuts the end surface 118 of proportioner 42. Therefore, outlet 100 opens into an annular chamber 166 defined by housing section 116 of proportioner 42 and the inner end of bore 92, and outlet 102 opens into an annular chamber 168 defined by a part of bore 92 and between housing section 112 of proportioner 42 and housing section 116 of proportioner 40.

Housing section 116 has a stepped bore 170 formed therethrough with the outer end 172 being smaller in diameter than bore portion 136 of housing section 112. The other end 174 of proportioning piston 140 is reciprocably and sealingly received in the bore outer end 172. A shoulder 176 formed in bore 170 provides transition to a larger diameter bore portion defining a valve chamber 178. Another shoulder 180 in bore 170 near end 164 provides a spring seat for vale spring 182. Valve 184 is reciprocably received in valve chamber 178 with sufficient annular clearance relative to the chamber side wall formed by bore 170 to permit flow of fluid past the valve outer edge. The valve 184 is continuously urged toward engagement with shoulder 176 by spring 182. The valve 184 cooperates with valve seat 186 formed on the end 174 of proportioning piston 140. A bore 188 extending through piston 140 has its outer end 190 in continuous fluid communication with bore 132 of housing section 112. The inner end 192 of bore 188 opens through valve seat 186. Thus, when proportioning piston is biased inwardly against proportioner spring 194 as the force differential on the piston increases with an increase in master cylinder output pressures, valve seat 186 may engage valve 184 and proportion pressure from inlet 102 to outlet 104. The valve 184 and valve seat 186 of modular proportioner assembly 42 will similarly proportion pressure from inlet 100 to outlet 106.

The use of a cross-split brake system as shown in FIG. 1 requires two modular proportioner assemblies, one for each rear wheel brake conduit. Should a front-and-rear split system be used, only one modular valve assembly is needed, with the outlet thereof connected to the conduit leading to both rear brakes.

The arrangement embodying the invention particularly lends itself to automatic assembly of the proportioning part of the master cylinder. The various elements are merely inserted in order in bore 92. The housing section 116 is preassembled with valve spring 182 and valve 184 in place, as well as seal 160. The other seals on the other housing sections and on the proportioning piston are similarly preinstalled. It is then only a matter of inserting each element in the bore 92. In the arrangement of FIG. 4, this involves first assembling modulating proportioner assembly 42 in bore 92 by inserting housing section 116, housing section 114, spring 194, proportioning piston 140 and housing section 112. Modular proportioner assembly 40 is then assembled in the same manner, with end 164 of its housing section 116 abutting the end 118 of the housing section 112 of assembly 42. After all sections are inserted, retainer 98, which may be a snap ring, is installed, and all housing sections of both modular proportioner assemblies are held in place in abutting relation in bore 92. The machining operation on the master cylinder housing 50 to form bore 92 is simpler than when several bore steps and shoulders must be formed, because bore 92 has a constant diameter. It is a simple matter to remove and replace any section of either proportioner assembly should that be required.

The embodiments of the invention in which an exclusive property or privilege is claimed are defined as follows:

1. A fluid pressure proportioner comprising a housing having a constant diameter first bore formed therein defined by a cylindrical bore wall, a bore closed end and a bore open end;

a pressure fluid inlet formed in said housing and opening through said cylindrical bore wall into said first bore;

a pressure fluid outlet formed in said housing and opening through said cylindrical bore wall into said first bore;

and a proportioner valve assembly in said first bore arranged to permit fluid flow from said inlet through said proportioner valve assembly to said outlet and to proportion outlet fluid pressure relative to inlet fluid pressure through a predetermined inlet fluid pressure range;

said proportioner valve assembly including a first piston secton having a second bore therethrough and a spring loaded valve seat therein permitting fluid flow thereabout through said second bore from and to said inlet, said first piston section slidably fitting in said first bore with one end engaging said bore closed end, said first piston section having a seal engaging said cylindrical bore wall preventing fluid flow between said cylindrical bore wall and said first piston section;

a second piston section cylindrically formed with an inner peripheral wall and an outer peripheral wall and end surfaces, one of said end surfaces being in abutting relation with the other end of said first piston section and the outer peripheral wall being fitted within said cylindrical bore wall in free slidable relation thereto;

a third piston section having a shouldered third bore formed therein, one end in abutting relation with and also loosely piloted within the other end surface of said second piston section, the other end in abutting relation with retaining means in said first bore and having said third bore closed, passage means transversely through said third piston section fluid connecting the third bore closed end with said outlet, and seal means between said third piston section and said cylindrical bore wall and on opposite sides of said passage means preventing fluid flow between said cylindrical bore wall and said third piston section;

and a valve member received in said second and third bores of said first and third piston sections and cooperating with said valve seat to define a proportioning valve;

and a proportioning valve spring acting on said first piston section and said valve member to urge said proportioning valve open;

said valve member having proportional end surface areas cooperating with fluid pressure thereon to obtain the desired proportioning action;

said first and second piston sections, said spring, said valve member and said third piston section being assembled within said first bore by inserting them in order and then installing said retaining means.

* * * * *

UNITED STATES PATENT AND TRADEMARK OFFICE
CERTIFICATE OF CORRECTION

PATENT NO. : 4,490,978
DATED : January 1, 1985
INVENTOR(S) : Hubert Hogg

It is certified that error appears in the above-identified patent and that said Letters Patent is hereby corrected as shown below:

Column 3, line 46, "16" should read -- 116 --.

Column 4, line 7, "vale" should read -- valve --.

Column 5, line 12, "secton" should read -- section --.

Column 6, line 21, "proportional" should read -- proportioned --.

Signed and Sealed this

Eleventh Day of June 1985

[SEAL]

Attest:

DONALD J. QUIGG

Attesting Officer     Acting Commissioner of Patents and Trademarks